US005458431A

United States Patent [19]

Ferreol-Ragotin

[11] Patent Number: 5,458,431

[45] Date of Patent: Oct. 17, 1995

[54] MODULAR FRANKING MACHINE INCLUDING AN AUTOMATIC CENTERING AND LOCKING MODULE ASSEMBLY DEVICE

[75] Inventor: André Ferreol-Ragotin, Evry, France

[73] Assignee: Societe Anonyme Dite Neopost Industrie, Bagneux, France

[21] Appl. No.: 148,618

[22] Filed: Nov. 8, 1993

[30] Foreign Application Priority Data

Nov. 10, 1992 [FR] France .................................. 92 13537

[51] Int. Cl.[6] ........................................ F16B 7/00

[52] U.S. Cl. ............................ 403/322; 403/325; 101/91

[58] Field of Search .............................. 101/91; 403/322, 403/321, 325, 315, 319, 320, 49, 24

[56] References Cited

U.S. PATENT DOCUMENTS

| | | | |
|---|---|---|---|
| 2,179,232 | 11/1939 | Ogden | 101/91 |
| 4,519,311 | 5/1985 | Lowe | 101/91 |
| 4,792,255 | 12/1988 | McArthur et al. | 403/322 X |
| 4,906,123 | 3/1990 | Weskamp et al. | 403/322 |
| 5,002,500 | 3/1991 | Zuccaro et al. | |
| 5,093,560 | 3/1992 | Abellana . | |
| 5,163,366 | 11/1992 | Gregoire et al. | 101/91 |
| 5,170,705 | 12/1992 | Haroutel | 101/91 |
| 5,197,383 | 3/1993 | Gregoire et al. | 101/91 |

FOREIGN PATENT DOCUMENTS

| | | |
|---|---|---|
| 2664722 | 1/1992 | France . |
| 2173738 | 10/1986 | United Kingdom . |
| 2235656 | 3/1991 | United Kingdom . |

*Primary Examiner*—Randolph A. Reese
*Assistant Examiner*—Harry C. Kim
*Attorney, Agent, or Firm*—Sughrue, Mion, Zinn, Macpeak & Seas

[57] ABSTRACT

A modular franking machine comprises first and second modules. A module assembly device holds the first module in alignment with the second module. It comprises at least one projecting shaft fixed to the first module and a sheath in the second module. The shaft is inserted in the sheath by translatory movement. The shaft is locked in position relative to the sheath when inserted in it. The locking system comprises a piston mobile axially inside the shaft to displace a retractable member housed inside the shaft so that it projects towards the exterior of the shaft and an opening in the sheath to receive the projecting member in order to immobilize the shaft in the sheath.

6 Claims, 8 Drawing Sheets

MODULAR FRANKING MACHINE INCLUDING AN AUTOMATIC CENTERING AND LOCKING MODULE ASSEMBLY DEVICE

BACKGROUND OF THE INVENTION

1. Field of the Invention

The invention concerns a modular franking machine comprising first and second modules, a module assembly device, adapted to hold the first module in alignment with the second module, comprising at least one projecting shaft, fixed to the first module, and a sheath formed in the second module, the shaft being adapted to be inserted in the sheath by translatory movement, and means for locking the shaft in position relative to the sheath when inserted therein.

2. Description of the Prior Art

The document FR-2664722 (corresponding to U.S. Pat. No. 5,170,705 - Haroutel) discloses a modular franking machine comprising a printhead, a base, a device for assembling the printhead to the base and comprising a shaft carried by the base and adapted to be inserted into a sheath in the printhead, and means for locking the shaft in position relative to the sheath, and comprising a hook pivoted on the base and cooperating with a detent carried by the printhead.

This prior art assembly device enables centering of the printhead relative to the longitudinal axis of the shaft. Because the locking hook is far away from the longitudinal axis of the shaft, operation of the hook to cooperate with the detent may bend the shaft. One object of the invention is to remedy this drawback.

The two modules are assembled together by offering up the printhead to the base of the franking machine so that the shaft can be inserted in the sheath, and then maneuvering the hook into cooperation with the detent when the shaft is completely inserted in the sheath. Consequently, assembling these two modules requires two separate operations.

There is now a requirement for a franking machine module assembly device which can assemble two modules of the machine and lock them in position in a single operation, i.e. by merely inserting the shaft in the sheath. However, a device of this kind must enable easy disassembly of the two modules without risk of bending the shaft. It is therefore necessary for the locking of the shaft in the sheath to be cancelled by simple mechanical or electromechanical command.

SUMMARY OF THE INVENTION

The invention consists at a modular franking machine comprising first and second modules, a module assembly device adapted to hold the first module in alignment with the second module and comprising at least one projecting shaft, fixed to the first module, and a sheath in the second module, the shaft being adapted to be inserted in the sheath by translatory movement, and means for locking the shaft in position relative to the sheath when inserted therein, in which machine said locking means comprise a piston axially movable inside said shaft to displace a retractable member housed inside said shaft, so that the member it projects towards the exterior of said shaft, and an opening in said sheath to receive said projecting a retractable member in order to immobilize said shaft in said sheath. Axial movement of the piston locks the shaft in the sheath without risk of bending the shaft.

In one particularly simple embodiment of the invention the piston has a portion forming a ramp which displaces the retractable member towards the exterior of the shaft. The retractable member may be a ball and the opening in the sheath may be a bore.

According to another aspect of the invention the assembly device further comprises a system for maneuvering the piston to displace the piston axially and automatically in the shaft during insertion of the shaft into the sheath. Thus assembly of the two modules and locking of the shaft in position in the sheath require only one operation.

Further in accordance with the invention the machine further comprises an unlocking system adapted to exert an axial thrust force on the piston so as to unlock the shaft from the sheath automatically and to actuate the maneuvering system to separate the first module from the second module. This arrangement enables not only fast unlocking of the shaft from the sheath without bending the shaft but also easier disassembly of the two modules by automatic separation thereof.

One embodiment of the invention is described in detail hereinafter with reference to the drawings.

DETAILED DESCRIPTION THE INVENTION

Figure 1:
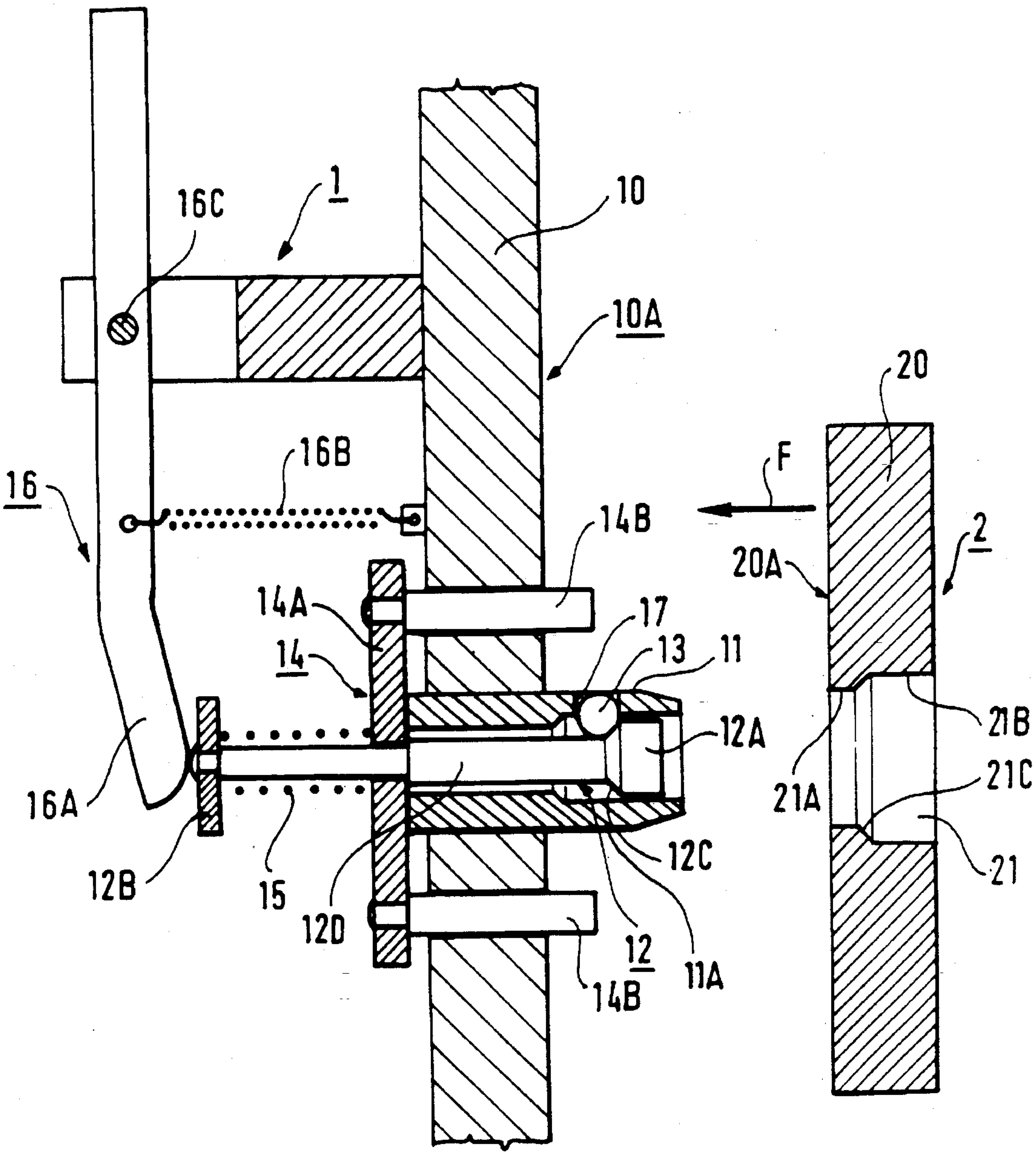
FIGS. 1 through 4 are diagrams showing an assembly device and a locking/unlocking system in cross-section and during various phases of assembly and disassembly of two modules in a franking machine.
Figure 2:
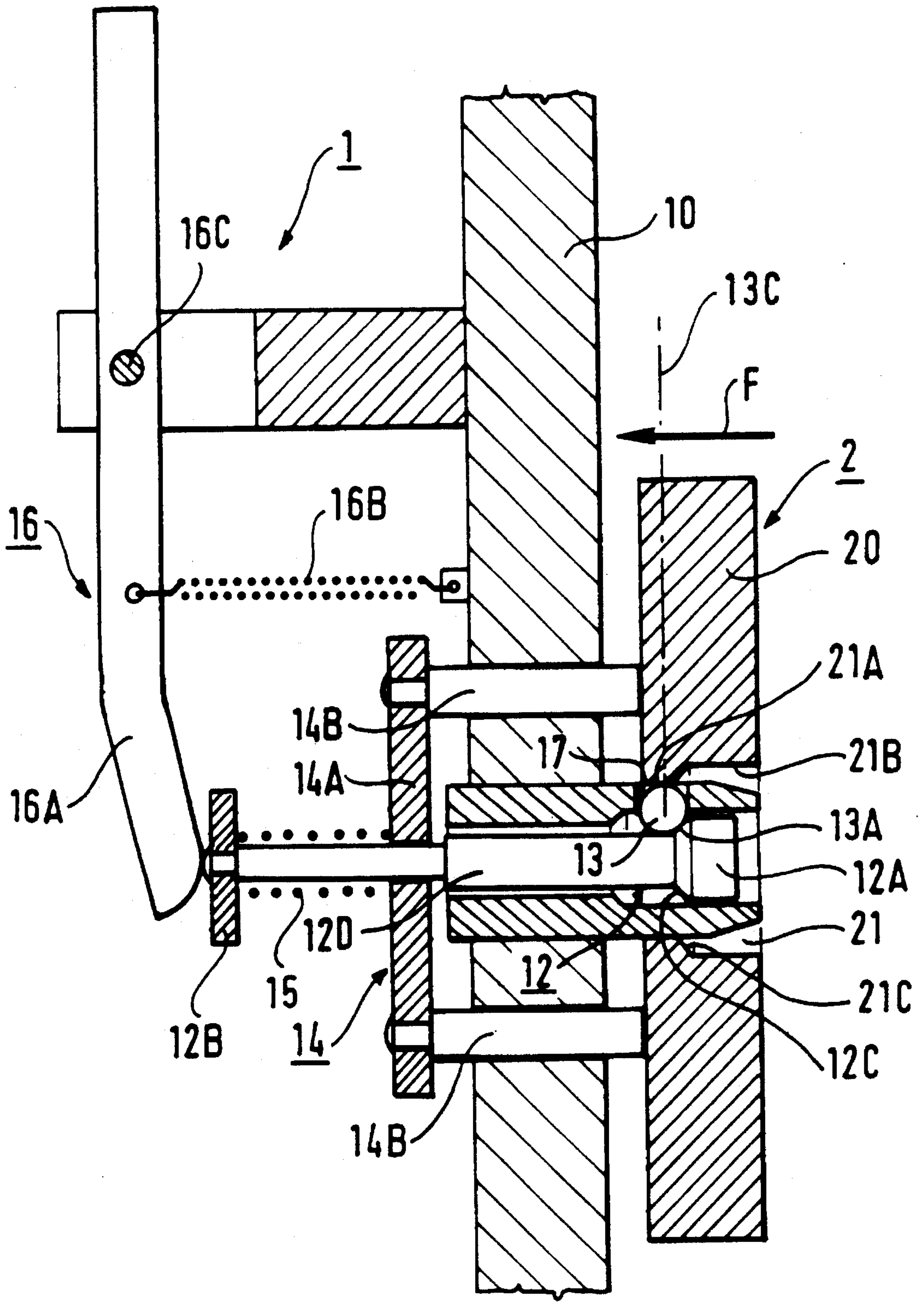
Figure 3:
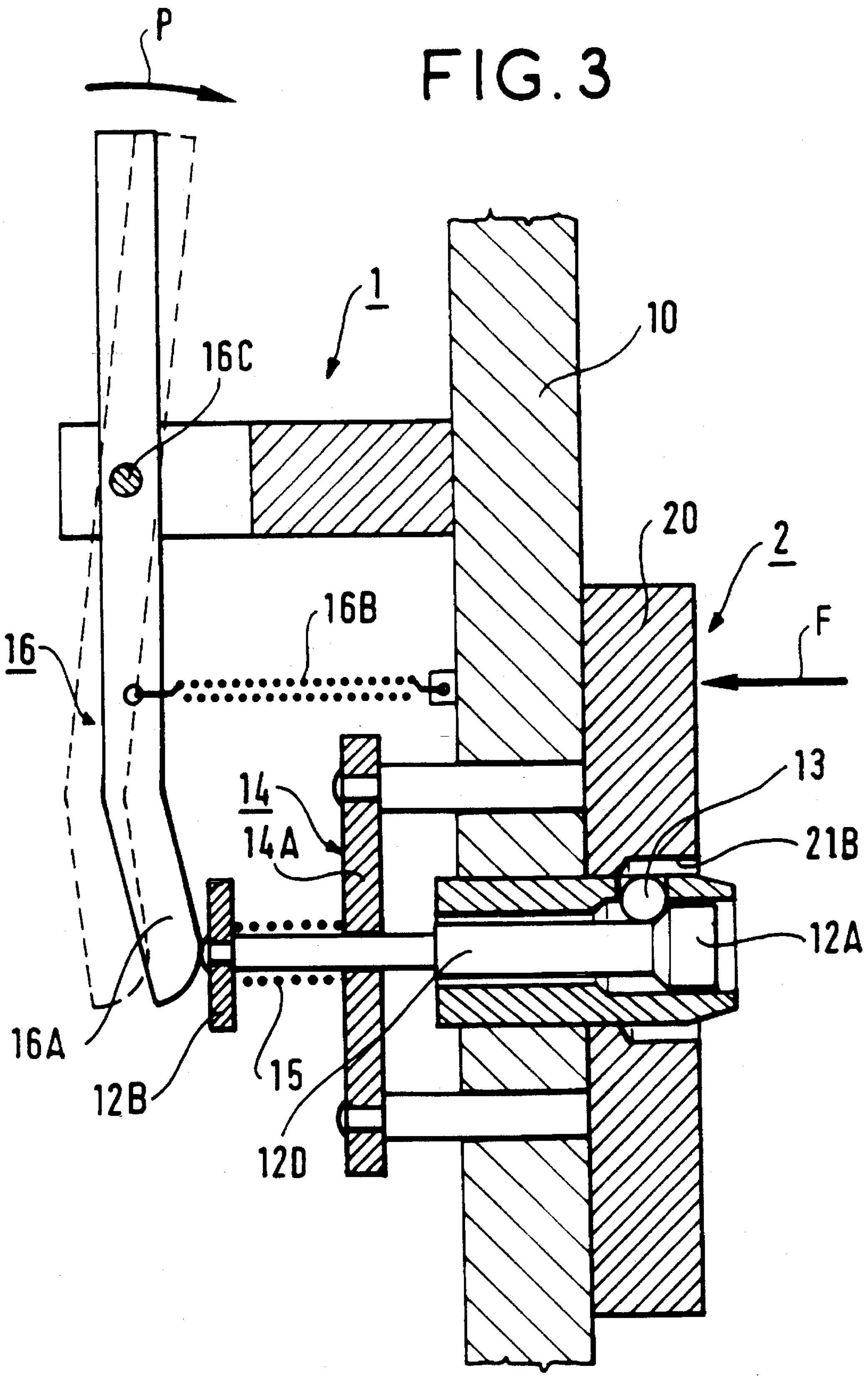

FIGS. 1 through 3 show part of a franking machine comprising two modules to be assembled in alignment, for example a module 1 constituting the base of a franking machine and a module 2 constituting a device for feeding mail items to the franking machine.

The module 1 has a reference plate 10 with a relatively plane bearing surface 10A and forming part of the external structure of the module 1. The module 2 comprises a reference plate 20 having a relatively plane bearing surface 20A and forming part of the external structure of the module 2.

The franking machine also incorporates a module assembly device designed to hold the module 1 in alignment with the module 2, the plates 10 and 20 then being contiguous.

This device comprises at least one shaft 11 in the form of a hollow tube passing through the plate 10 perpendicularly to its bearing surface and fastened to the plate 10. The shaft 11 projects from the bearing surface of the plate 10, i.e. it projects out of the module 1. It has a frustoconical end 11A.

The assembly device also includes a sheath 21 passing through the plate 20 and in the form of two bores 21A, 21B having different diameters and joined by a frustoconical portion 21C. The diameter of the bore 21A constituting the entry of the sheath is slightly greater than the outside diameter of the shaft 11 and the shaft 11 is inserted in the bore 21A with the least possible clearance.

A piston 12 slides axially inside the shaft 11. It comprises two cylinders 12A, 12D of different diameter joined by a frustoconical portion 12C forming a ramp. The cylinder 12A constitutes an end part of the piston 12 and has a larger diameter than the cylinder 12D.

One or more balls 13 are accommodated inside the shaft in a housing 17 and cooperate with the cylinders 12A, 12D and the frustoconical piston portion 12C. The housing 17 is such that the ball 13 can project towards the exterior of the shaft 11 when it rests on the cylinder 12A.

A maneuvering system 14 is provided for displacing the piston axially in the shaft during insertion of the shaft 11 into the sheath 21. The maneuvering system 14 comprises two shafts 14B passing through the plate 10 perpendicularly to its bearing surface 10A. The shafts 14B slide in the plate 10 and are disposed on opposite sides of the shaft 11. The two shafts 14B are linked by a plate 14A sliding along the cylinder 12D of the piston 12. A compression spring 15 is mounted on the piston 12 between the plate 14A and an abutment 12B at the end of the piston. The spring 15 is compressed by displacement of the plate 14A to displace the piston axially in the shaft 11 when the ball 13 is facing the bore 21B far from the entry of the sheath 21, the shaft 11 being then completely inserted into the sheath 21.

An unlocking system 16 is provided for applying an axial thrust to the end 12B of the piston 12 so as to retract the ball 13 and unlock the shaft 11 automatically from the sheath 21 and separate the two plates 10 and 20.

Referring to the figures, the unlocking system comprises a lever 16A pivoted to the plate 10 about an axis 16C and acted on by a return spring 16B fixed to the plate 10 at one end.

The two modules 1, 2 are assembled as follows.

The plate 10 of the module 1 remains fixed. The plate 20 of the module 2 is offered up to the plate 10 in the direction shown by the arrow F in FIG. 1, the opening of the sheath 21 facing the frustoconical end part 11A of the shaft 11. The plate 20 is centered automatically on the longitudinal axis of the shaft 11 by insertion of the frustoconical end part 11A of the shaft 11 into the bore 21A. As insertion continues the shaft 11 is inserted in the sheath 21 and the bearing surface of the plate 20 comes into contact with the free ends of the shafts 14B (FIG. 2). The entry of the bore 21 is substantially aligned with the middle 13C of the ball 13 which holds the ball 13 retracted in its housing 17.

As insertion continues (FIG. 3) the shafts 14B are pushed by the plate 20 and slide with in it. They entrain the plate 14A which slides along the axis of the piston 12. Because the ball 13 is in its housing 17 it prevents axial displacement of the piston 12 in the direction F in the shaft 11. The spring 15 is compressed until the ball 13 is aligned with the bore 21B. At this moment the two bearing surfaces 10A, 20A are in contact.

Figure 4:
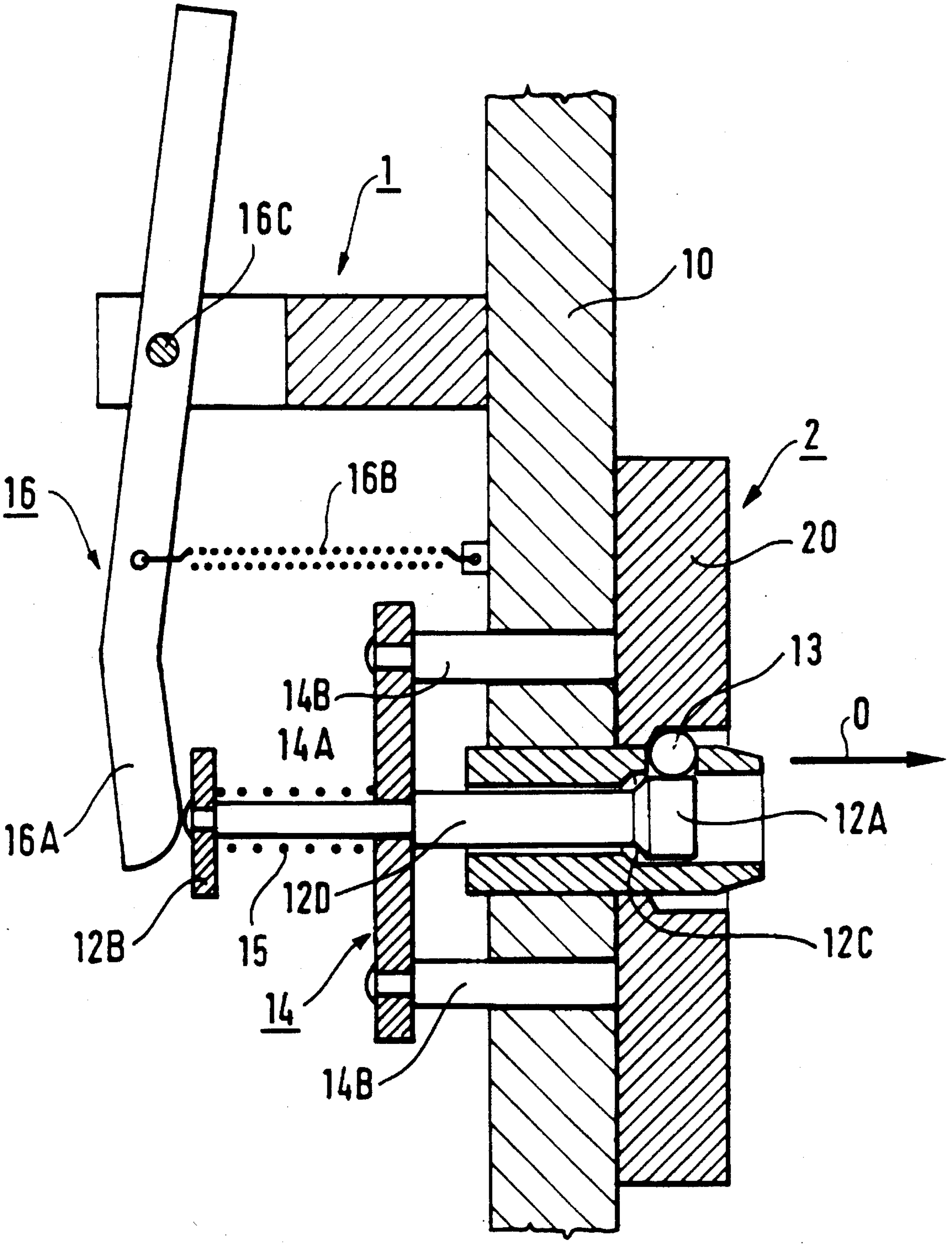

The compressed spring 15 expands which moves the piston 12 axially in the shaft 11 in the direction shown by the arrow F. The ball 13 is then displaced towards the outside of the shaft 11, raised up by the frustoconical portion 12C and engaging in the bore 21B (FIG. 4). It is held in this position resting on the cylinder 12A to lock the shaft in position in the sheath.

The displacement of the piston 12 by the spring 15 pivots the lever 16 about the axis 16C as shown by the arrow P in FIG. 3. The return spring 16B holds the end of the lever 16A in contact with the end 12B of the piston, opposing displacement of the lever 16A in the direction shown by the arrow F. The compression spring 15 is naturally much less stiff than the return spring 16B.

The shaft is unlocked from the sheath as follows. The lever 16B is maneuvered by hand or by a maneuvering member in order to exert a thrust on the end 12A of the piston. The piston 12 slides in the shaft in the direction shown by the arrow O in FIG. 4. The spring 15 is compressed and the shafts 14B and the plate 14A remain in position. As this maneuver continues the frustoconical portion 12C of the end part 12A of the piston reaches the ball 13 which can then retract into its housing 17. The ball 13 then no longer projects into the bore 21B, enabling the sheath 21 to slide along the axis of the shaft 11. Because the spring 15 was compressed, it expands and pushes the plate 14A and the shafts 14B in the direction shown by the arrow O. The shafts 14B then push the plate 20, which assists separation of the two modules 1 and 2.

Figure 5:
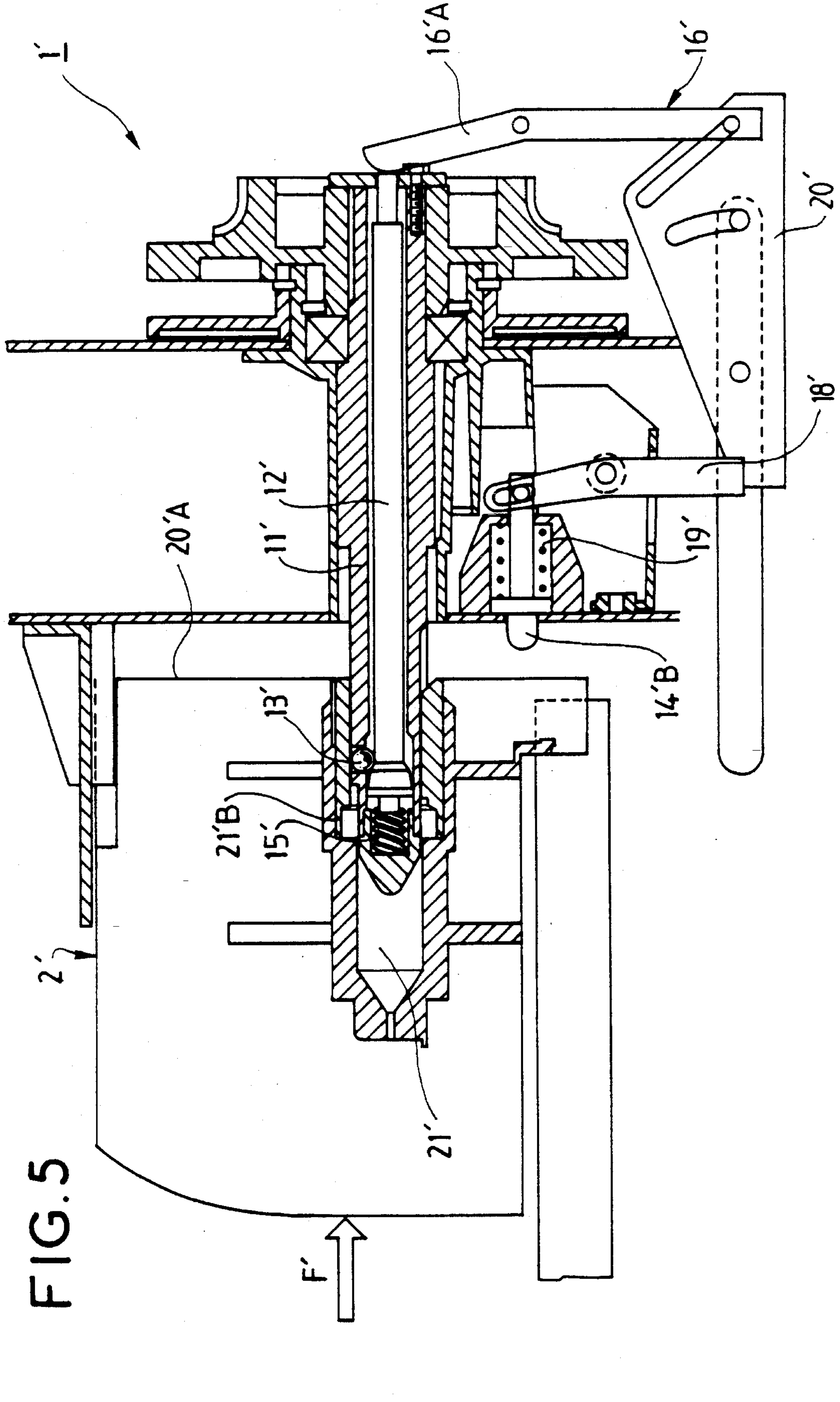
FIGS. 5 through 7 show in detail an assembly device and a locking/unlocking system for assembling and disassembling a franking machine printhead and a franking machine base.
Figure 6:
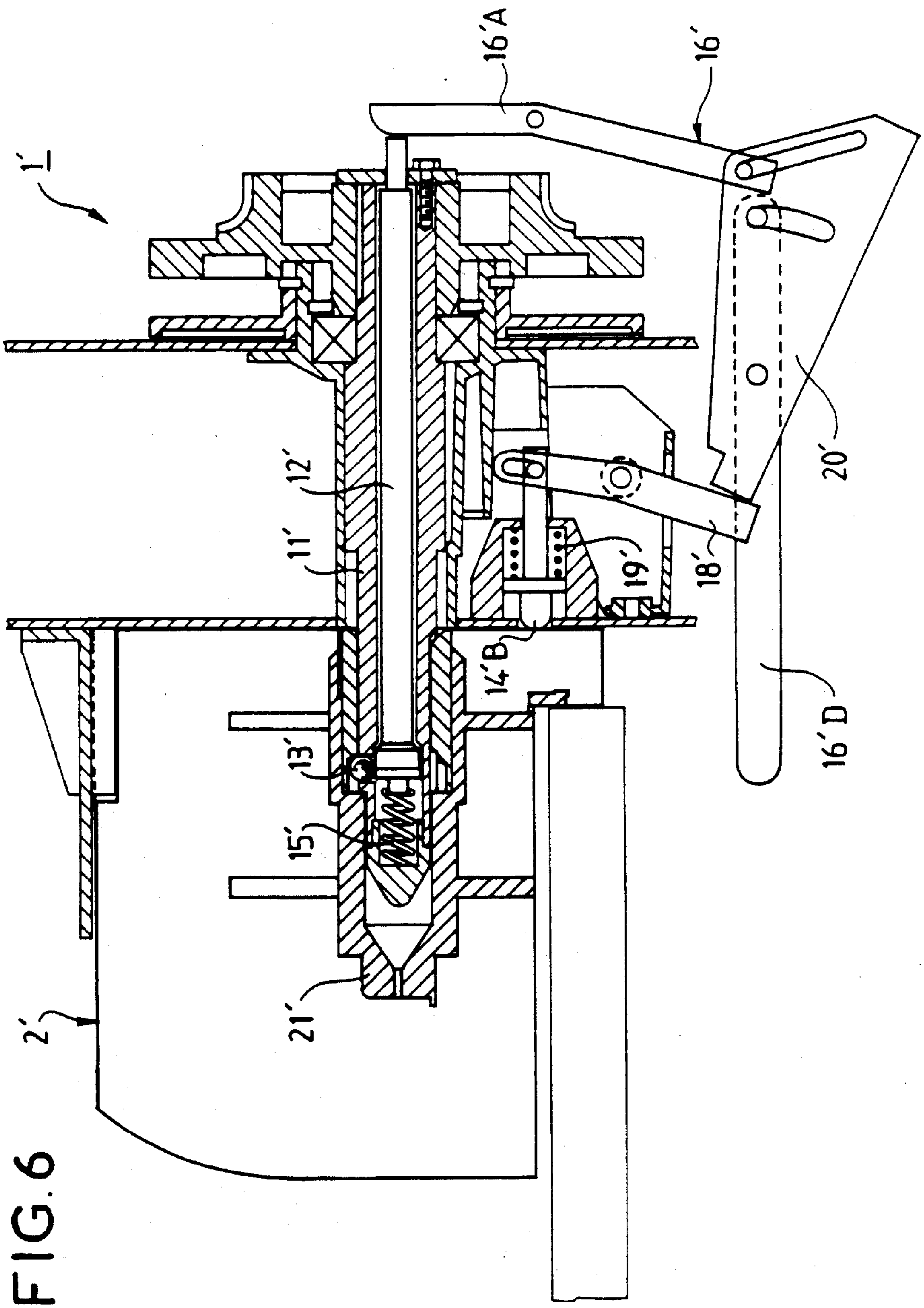
Figure 7:
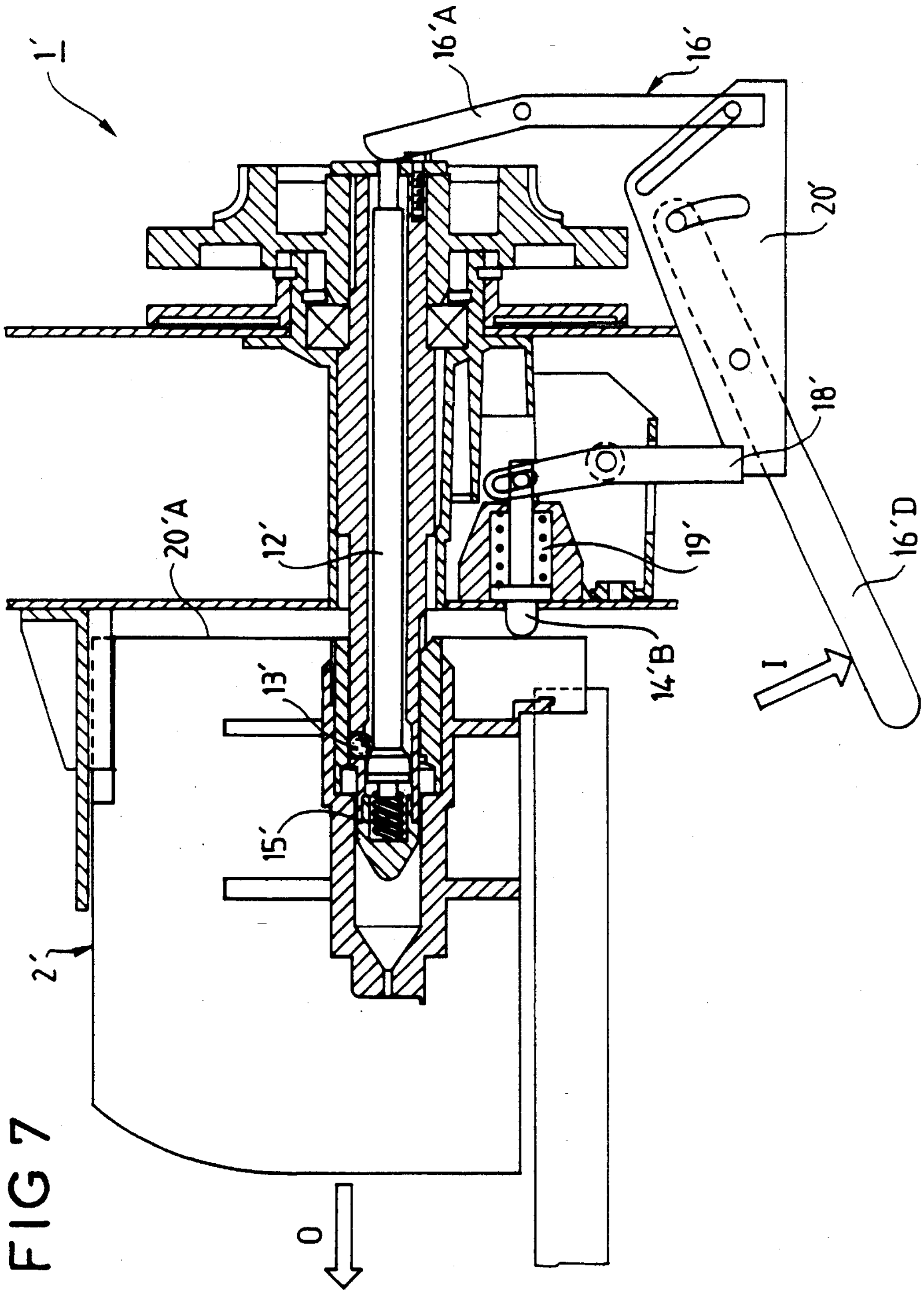

FIGS. 5 through 7 show part of a franking machine comprising a franking machine head 2' and a franking machine base 1' to be assembled in alignment with each other.

Figure 8:
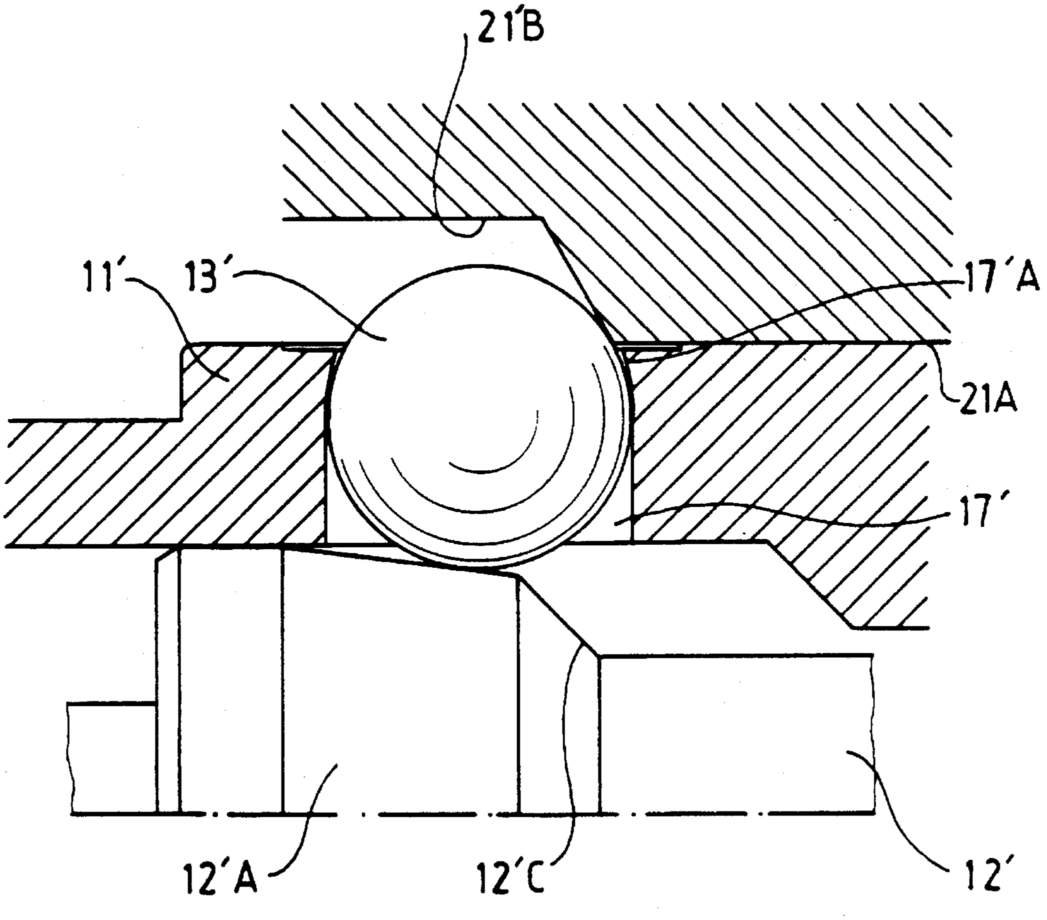
FIG. 8 shows the retractable locking member in more detail.

Referring to FIGS. 5 and 6 the head 2' is offered up to the base 1' in the direction of the arrow F'. The rotary shaft 11' of the base is inserted in the sheath 21' of the head. The bearing surface 20'A of the head contacts a shaft 14'B to push on a pivoted link 18', compressing a spring 19'. The link 18' is coupled to a lever 16'A by a pivoted part 20'. It pivots to release a locking/unlocking mechanism 16' comprising the lever 16'A in contact with a piston 12' mobile axially in the shaft 11'. On withdrawing towards the right in FIG. 6 the lever 16'A enables the piston 12' to be drawn towards the right by the precompressed spring 15'. The ball 13' engages in a bore 21'B. Referring to FIG. 8, the ball 13' is accommodated in a housing 17' inside the shaft 11' and projects into the bore 21'B through an opening 17'A in the shaft when the ball 13' is supported by a frustoconical part 12'C of the piston 12'. The opening 17'A is small to restrict the displacement of the ball.

Referring to FIG. 7, to disassemble the head 2' from the base 1' a lever 16'D is maneuvered in the direction of the arrow I to pivot the lever 16'A to displace the piston 12' towards the left. The spring 15' is compressed and the ball 13' retracts into its housing 17'. At this moment the expanding spring 19' causes the shaft 14'B to push on the bearing surface 20'A. The shaft 14'B entrains the link 18' which prevents displacement of the lever 16'A through the intermediary of the part 20'.

There is claimed:

1. A modular franking machine comprising: first and second modules; a module assembly device adapted to hold the first module in alignment with the second module, and having at least one projecting shaft fixed to the first module; a sheath in the second module, the shaft being adapted to be inserted in the sheath by translatory movement; and means for locking the shaft in position relative to the sheath when inserted therein;

wherein said locking means comprise: a piston, axially movable inside said shaft to displace a retractable member housed inside said shaft so that said retractable member projects towards the exterior of said shaft; and an opening in said sheath to receive said projecting retractable member in order to immobilize said shaft in said sheath;

wherein said assembly device further comprises a system for maneuvering said piston to displace said piston axially and automatically in said shaft during insertion of said shaft into said sheath;

wherein said maneuvering system comprises: a thrust member sliding inside said first module and adapted to be pushed along said piston by said second module when said shaft is inserted in said sheath; and a compression spring mounted on said piston and opposing displacement of said thrust member to displace said piston when said retractable member is aligned with said opening in said sheath; and wherein said thrust member comprises two sliding shafts one on each side of said shaft and linked together by a plate movable along said piston.

2. The machine according to claim 1, wherein said piston has a portion forming a ramp which displaces said retractable member towards the exterior of said shaft.

3. The machine according to claim 1, wherein said retractable member is a ball.

4. The machine according to claim 1, wherein said opening in said sheath is a bore spaced from the entry of said sheath.

5. A modular franking machine comprising: first and second modules; a module assembly device adapted to hold the first module in alignment with the second module, and having at least one projecting shaft fixed to the first module; a sheath in the second module, the shaft being adapted to be inserted in the sheath by translatory movement; and means for locking the shaft in position relative to the sheath when inserted therein;

wherein said locking means comprise: a piston, axially movable inside said shaft to displace a retractable member housed inside said shaft so that said retractable member projects towards the exterior of said shaft; and an opening in said sheath to receive said projecting retractable member in order to immobilize said shaft in said sheath;

wherein said assembly device further comprises a system for maneuvering said piston to displace said piston axially and automatically in said shaft during insertion of said shaft into said sheath;

wherein said maneuvering system comprises: a thrust member sliding inside said first module and adapted to be pushed along said piston by said second module when said shaft is inserted in said sheath; and a compression spring mounted on said piston and opposing displacement of said thrust member to displace said piston when said retractable member is aligned with said opening in said sheath;

said machine further comprising an unlocking system adapted to exert an axial thrust force on said piston so as to unlock said shaft from said sheath automatically and to actuate said maneuvering system to separate said first module from said second module.

6. The machine according to claim 5 wherein said unlocking system comprises: a lever pivoted to said first module and a return spring coupled to said lever and opposing displacement of said lever.

* * * * *